C. E. K. MEES.
METHOD AND APPARATUS FOR MAKING PHOTOGRAPHIC RECORDS.
APPLICATION FILED JUNE 14, 1919.
1,396,770.
Patented Nov. 15, 1921.
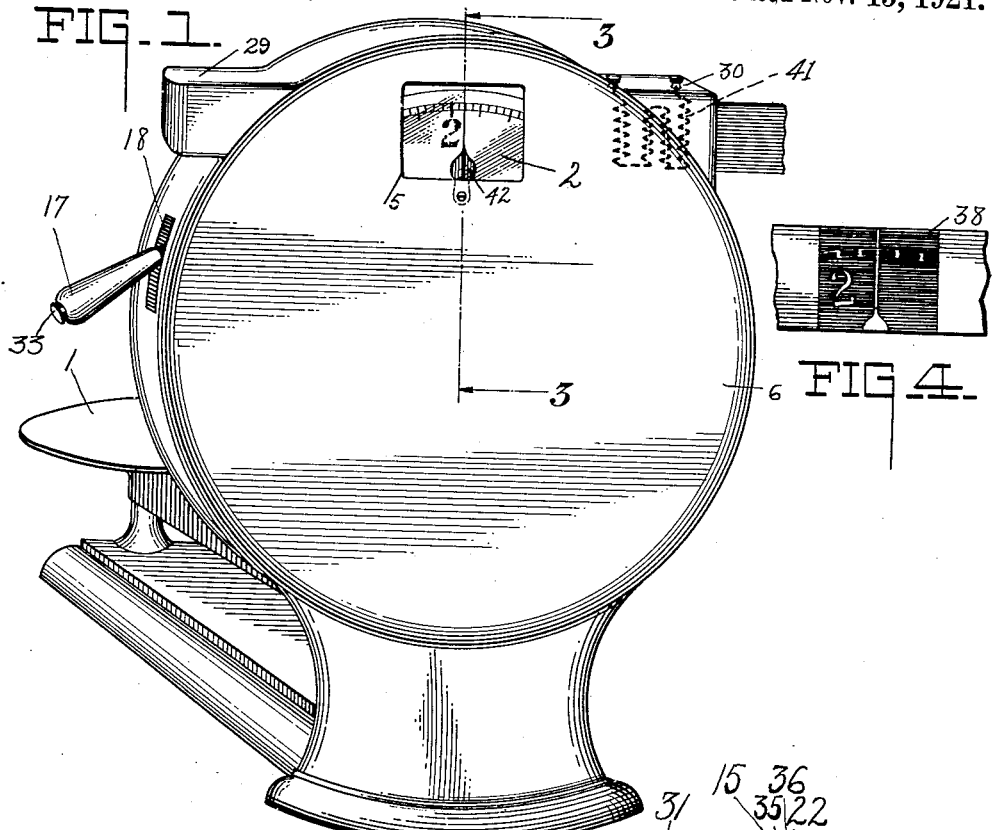
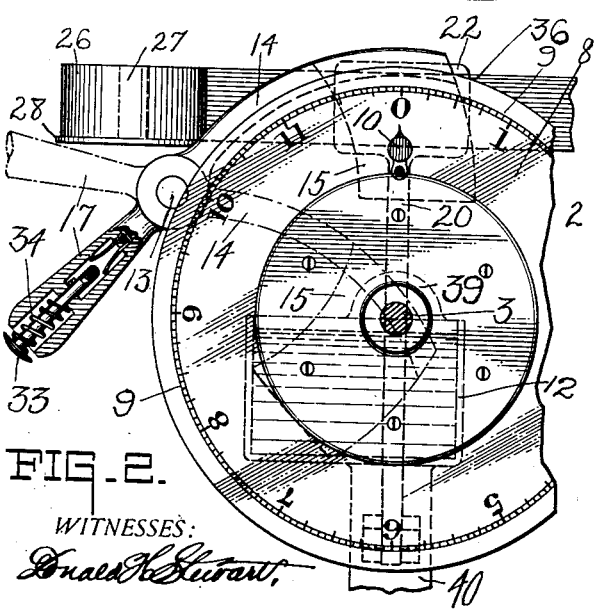

UNITED STATES PATENT OFFICE.

CHARLES E. K. MEES, OF ROCHESTER, NEW YORK, ASSIGNOR TO EASTMAN KODAK COMPANY, OF ROCHESTER, NEW YORK, A CORPORATION OF NEW YORK.

METHOD AND APPARATUS FOR MAKING PHOTOGRAPHIC RECORDS.

1,396,770.  Specification of Letters Patent.  Patented Nov. 15, 1921.

Application filed June 14, 1919. Serial No. 304,300.

*To all whom it may concern:*

Be it known that I, CHARLES E. KENNETH MEES, a subject of the King of Great Britain, residing at Rochester, in the county of Monroe and State of New York, have invented certain new and useful Improvements in Methods and Apparatus for Making Photographic Records, of which the following is a full, clear, and exact specification.

This invention relates to a new and simple method of making photographic records that will not be readily affected by light and to apparatus for carrying out such method.

The objects of my invention are to simplify the art of photography, to furnish a new and shorter method of producing photographic images of any desired object which will avoid the use of any baths other than water and can be performed without the use of a dark room; which will be rapid and simple in execution; and which does not require elaborate or expensive apparatus or materials. It is a further object to provide such apparatus as may be necessary to carry out the process; which apparatus will be simple to make and use and efficient in operation. Further objects will appear hereinafter.

I have discovered that certain prepared surfaces which when dry are not visibly affected by actinic rays and which become only slightly, if at all, darkened or discolored even after long exposure to sunlight, will when wet, or even when only dampened, rapidly become quite dark or discolored under exposure to the light, and I have utilized this discovery to perfect a method whereby photographic records may be quickly and easily made, it being necessary only to expose a portion of material so prepared and dampened to the projection of a record or object which may be photographically or artificially made or a natural object, and let it be there light printed whereby a negative image is reproduced differentially according to the intensity of light in the various portions of the projected image. The record, object, image, data, legend or other matter to be reproduced may, of course, be projected by any desired means upon the dampened prepared surface, and I contemplate all such means and methods as being within the scope of my invention it being necessary only that the material when damp be subjected to the action of actinic rays, whatever their source and however they may be controlled, transmitted, reflected or modified to give any desired record action, and when I refer to the projection of light rays it is with this broad intent and meaning. While I have shown hereinafter a particular mechanism for carrying out my method, any equivalent means, whether in itself novel or not, may be used.

In order to illustrate one way in which my process may be applied and performed, I show herewith a weighing machine equipped with apparatus for producing photographic records of various readings of the scale; but it is to be distinctly understood that, while this embodiment is chosen by way of illustration, I consider as within the scope of my invention the use of any equivalent means, not only as applied to any desired form of measuring, computing, registering, recording or other machine; but also to other apparatus of any description.

I particularly contemplate the carrying out of my process by photographic apparatus, cameras, reproducing or printing machines.

Reference will now be made to that particular embodiment of my invention which is illustrated in the accompanying drawing, in which like reference characters designate like parts throughout.

Figure 1 is a perspective view of a weighing machine equipped with one form of my improved photographic recording means;

Fig. 2 is a fragmentary front elevation of that portion of the mechanism which includes my improved recording means, the exterior casing being removed, and taken on line 2—2 of Fig. 3, in the direction indicated;

Fig. 3 is a sectional view taken on line 2—2 of Fig. 1 in the direction indicated;

Fig. 4 is a view of a section of photographic material showing a record as made by my apparatus.

The weighing machine, which is of any usual or desired construction comprises a platform 1 upon which the article to be weighed is placed and a legend bearing dial 2, carried on a shaft 3, which is actuated by suitable lever means 4 connected with the platform 1. The dial 2 moves opposite a window 5 in the casing 6 and a fixed pointer 42 indicates by registry with the data on the dial the weight of the object on the platform. This structure and the details thereof constitute no part of my invention.

The shaft 3 is mounted at one end in a wall of the casing 6 and at the other end in an extension 39 of a wall of the tank 12 which will be later described. On this shaft 3 is mounted another dial 7, the annular outer portion 8 of which, at least, is transparent and bears opaque numerals and graduations 9, corresponding to those on the dial 2, and adapted to register with a pointer 10, fixed in the glass panel 11. In the rear of this dial there is a tank 12 or other liquid retainer, which is rigidly mounted on support 40. Pivoted on a shaft 13, which is supported on the casing 6, is an arm 14 carrying a blade 15 which normally rests in the water 16 in the tank 12. This arm is operated by the handle 17 which extends through an aperture 18 in the casing 2.

Pivoted at 19 to the support 40 is another arm 20 adapted to rock toward and from the dial, the upper end of this arm having an extended portion 21 with a face of felt or other like material 22. This portion is pressed forward by a spring 23, and it has, just beneath the extended portion, a shoulder 24. The arm has a curved cam surface 25 below this shoulder.

A reel of suitably prepared paper 26 is mounted on a spindle 27 and on a platform 28. The end of the paper is led across the front of the felt surface 22 and is supported by the shoulder 24. The casing 6 has suitable extensions 29 and 30 to provide space for the magazine or supply of paper and to provide a channel through which the paper may be drawn out of the casing.

This paper is coated with an emulsion which when dry is visibly affected only slightly, if at all, by light rays and may be exposed to the light of day without harm. When damp, however, it darkens quickly and deeply under the effect of light. There are on the market a number of photographic developing out papers which have the qualities mentioned, an example being that sold as "insurance bromid".

As pointed out in my pending application, Serial No. 460,098, filed April 8, 1921, this quality is increased by the addition of certain materials, including sodium sulfite, to bromid emulsions either during manufacture or after coating, and the addition of such material induces this property in emulsions which formerly did not have it. An example of a typical bromid emulsion is given in that application.

The glass panel 11 forms one side of a lamp box 31, in which is an electric filament lamp 32. There is in the handle 17 a push button 33, normally pressed outwardly by spring 34, but which may be pressed inwardly to close a circuit to the lamp. The simple circuit is not shown as it involves no features of novelty or interest.

When the handle 17 is pushed down, the blade 15 is lifted from the liquid, and the upper edge, engaging the cam surface 25, pushes arm 20 back, permitting the surface of blade 15, which is covered with felt 35 or other absorbent material to brush across the surface of that portion 36 of the prepared paper which is supported on the shoulder 24, and dampen it, thus causing it to become sensitive to light rays and capable of being discolored thereby. The handle is at once raised again, permitting blade 15 to return to the tank and the paper 36 is pressed toward the data bearing disk 8. It does not press against it, however, because arm 20 engages a stop 37. The operator may now cause the illumination of the lamp 32 by pressing button 33. When a sufficient time has elapsed, the lamp is deënergized and the end of the strip of paper is pulled from the machine and torn off furnishing a record such as 38. Being only slightly dampened, it is printed and practically dry in a few seconds. Preferably, however, the channel part 30 is supplied with a well known form of electric resistance heating unit indicated in dotted lines at 41, so that the paper may be heated and dried as it leaves the machine. Any other desired drying means, whether attached to the apparatus or not, may be used.

Such a machine is of obvious utility in markets and stores, where each customer may be given a photographic record of the scale relating to his purchase. As the paper is insensitive when dry, it will not be further discolored, and the record will remain and be ample to furnish the customer with a sufficient memorandum of the transaction.

When in the specification and claims, I refer to the paper as insensitive when dry, I mean that it is relatively free from visible effects due to actinic light, and that it will not darken beyond such a small degree as will not affect its usefulness; and which is very slight as compared to the extent that it will darken when damp and exposed to actinic rays.

Having thus described my invention, what I claim as new and desire to secure by Letters Patent is:

1. The method of making a photographic record which consists in moistening a surface which is visibly affected by light only when damp, submitting such moistened surface to the action of light and drying said surface.

2. The method of reproducing an image which consists in moistening a surface which is visibly affected by light only when damp, causing a light projection of such image to fall upon such surface while damp, and drying said surface at once.

3. The method of reproducing an image which consists in dampening a material which darkens under the influence of light rays only when it is damp, causing a light projection of such image to fall upon said surface, whereby a record is made thereon differentially in accordance with the intensity of the light making up the various portions of the projection, and drying such material before the less affected portions thereof have become dark, whereby the record made thereon when damp is retained when dry.

4. A photographic printing machine comprising a magazine adapted to contain a supply of suitably prepared material, means for moistening a piece of such material and means for holding such piece of moistened material in an exposure position.

5. In combination an instrument having an image bearing portion, means for supporting in an exposure area a piece of material with a suitably prepared surface, the image bearing portion being so placed with relation to the exposure area that an image of at least a portion of the same may be projected thereon, means for dampening the surface of the material while held in such exposure area.

6. A photographic printing machine comprising means for holding a light transmitting, image bearing element, means for applying moisture to the surface of a suitably prepared material, means for holding such moistened material in the rear of such image bearing element, whereby light rays transmitted through said element will be projected on such material.

7. A photographic printing machine comprising means for holding a light transmitting, image bearing element, means for applying moisture to the surface of a piece of suitably prepared material, and means for pressing such moistened material toward said element and holding it in such position relative thereto that light rays passing through said element will be projected on said material and imprint the image thereon.

8. In combination a machine having relatively movable data indicating elements, means for holding a support with a suitably prepared surface in an exposure field, means for projecting an image of such relatively movable elements on such exposure field, and means for dampening the surface of a support while held in the exposure field.

9. A photographic printing machine comprising means for supporting an image carrying element, means for supporting suitable material in the rear of such image carrying element, and means adapted to pass between such material and image carrying element and to apply moisture directly to the surface of the material while in such position.

10. In combination, means for dampening a piece of suitably prepared material, means for supporting such dampened material in a position to be exposed to actinic light and means to dry such material after exposure.

11. In combination means for supporting a light transmitting image bearing element, means for moistening a piece of suitably prepared material, means for supporting such moistened material behind said element, so that it may be exposed to light rays, projected through said element, and means for drying said material.

12. In combination, an image carrying element, means to dampen a piece of suitable material, means to support said dampened material in an exposure area, means to project said image upon the exposure area, means by which the duration of exposure of the material to the projected image may be controlled, and means to dry said material after the exposure.

13. In combination, an instrument having a light transmitting, data bearing portion, a lamp situated upon one side of said portion, means to dampen a piece of suitably prepared material, means to support such dampened material on the other side of said data bearing portion, whereby the image of the latter is projected upon the dampened material, and means to dry the dampened material.

14. In combination, an instrument having a light transmitting data bearing portion, means to dampen a piece of suitably prepared material, means to support such dampened material behind said data bearing portion, means whereby the transmission of light through said data bearing portion upon said dampened material may be controlled at will and means to dry the dampened material.

15. In combination, an instrument having a data bearing portion, a lamp, means whereby the illumination of said lamp may be controlled at will, means to dampen a piece of suitably prepared material, means to support such dampened material in such a position that the lamp may project thereon an image indicating the data bearing portion.

16. In combination, an image bearing element, a magazine adapted to supply material which is visibly affected by light rays only when damp, a moisture containing means, means adapted to pass from the moisture containing means across the surface of a portion of such material, and means for holding such dampened portion in an exposure position where the image on said element may be projected upon it.

17. The process of making a photographic record which consists in moistening a surface which is visibly more affected by actinic rays when damp than when dry, submitting such moistened surface to the action of light, and permitting such light affected surface to dry.

18. The process of making a photographic record which consists in moistening a surface which is capable of becoming much darker in the presence of light when damp than when dry, and submitting such moistened surface to the projection of a light image thereon, and permitting such light affected surface to dry.

Signed at Rochester, New York, this 12th day of June 1919.

CHARLES E. K. MEES.